June 21, 1960

A. N. HENFLING 2,941,391

FLESHING MACHINE

Filed Nov. 8, 1957

INVENTOR.
ARTHUR N. HENFLING
BY
Patrick D. Beavers

June 21, 1960 — A. N. HENFLING — 2,941,391
FLESHING MACHINE
Filed Nov. 8, 1957 — 2 Sheets-Sheet 2
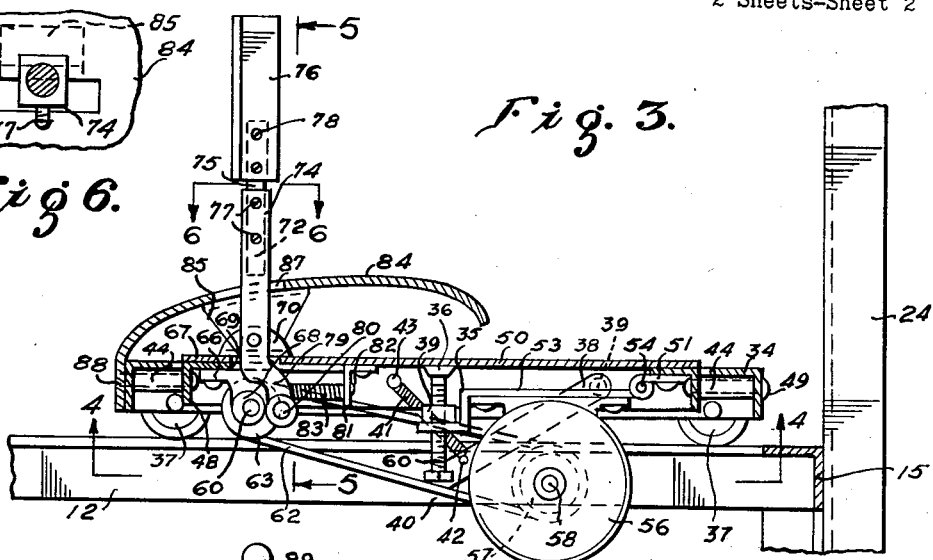
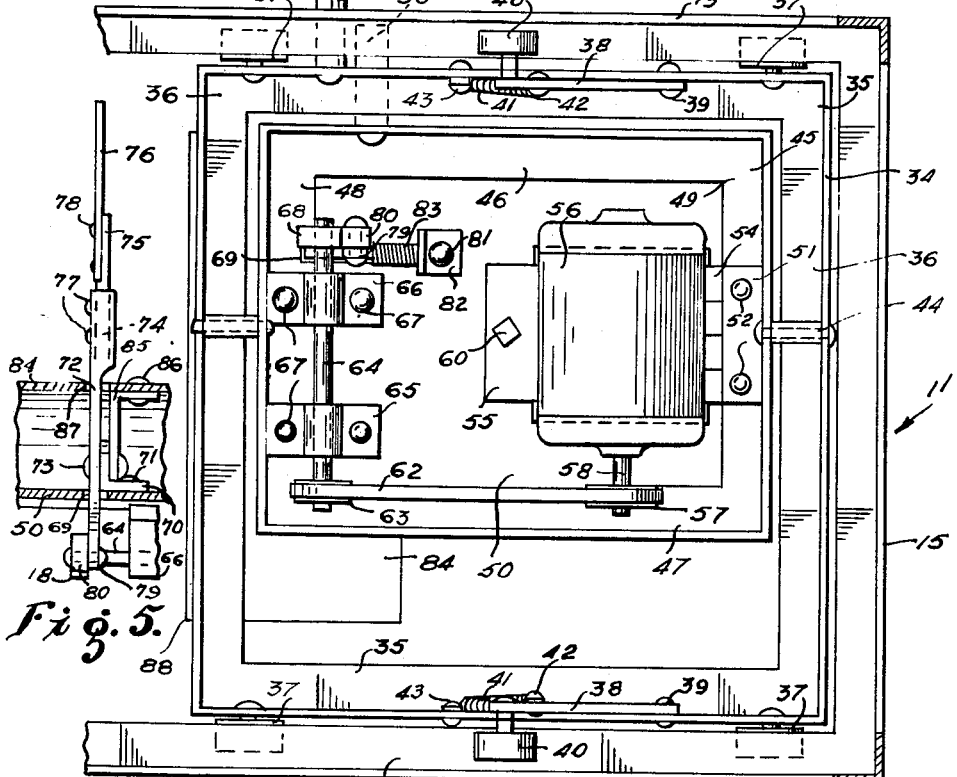
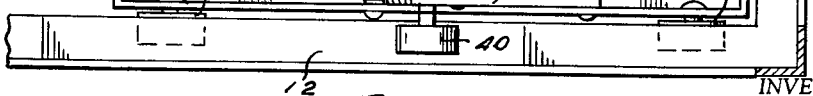
INVENTOR.
ARTHUR N. HENFLING
BY Patrick D. Beavers

United States Patent Office 2,941,391
Patented June 21, 1960

2,941,391

FLESHING MACHINE

Arthur N. Henfling, Eden Valley, Minn.

Filed Nov. 8, 1957, Ser. No. 695,269

4 Claims. (Cl. 69—46)

This invention relates to improvements in pelt fleshing machines.

An object of this invention is to provide a fleshing machine that will remove the fat and flesh from a pelt.

Another object of this invention is to provide a fleshing machine that is simple in construction, easy to operate so that a minimum amount of handling of a pelt is required.

A further object of this invention is to provide a fleshing machine that will eliminate or prevent injury to the pelt while the fat or flesh is being removed.

With the above and other objects and advantages in view, the invention consists of the novel details of construction, arrangement and combination of parts more fully hereinafter described, claimed and illustrated in the accompanying drawings, in which:

Fig. 3 is an enlarged longitudinal sectional view on the line 3—3 of Fig. 2;

Fig. 4 is a longitudinal sectional view on the line 4—4 of Fig. 3;

Fig. 5 is a vertical sectional view on the line 5—5 of Fig. 3;

Fig. 6 is a transverse sectional view on the line 6—6 of Fig. 3; and

Fig. 7 is a transverse sectional view on the line 7—7 of Fig. 1.

Figure 1:
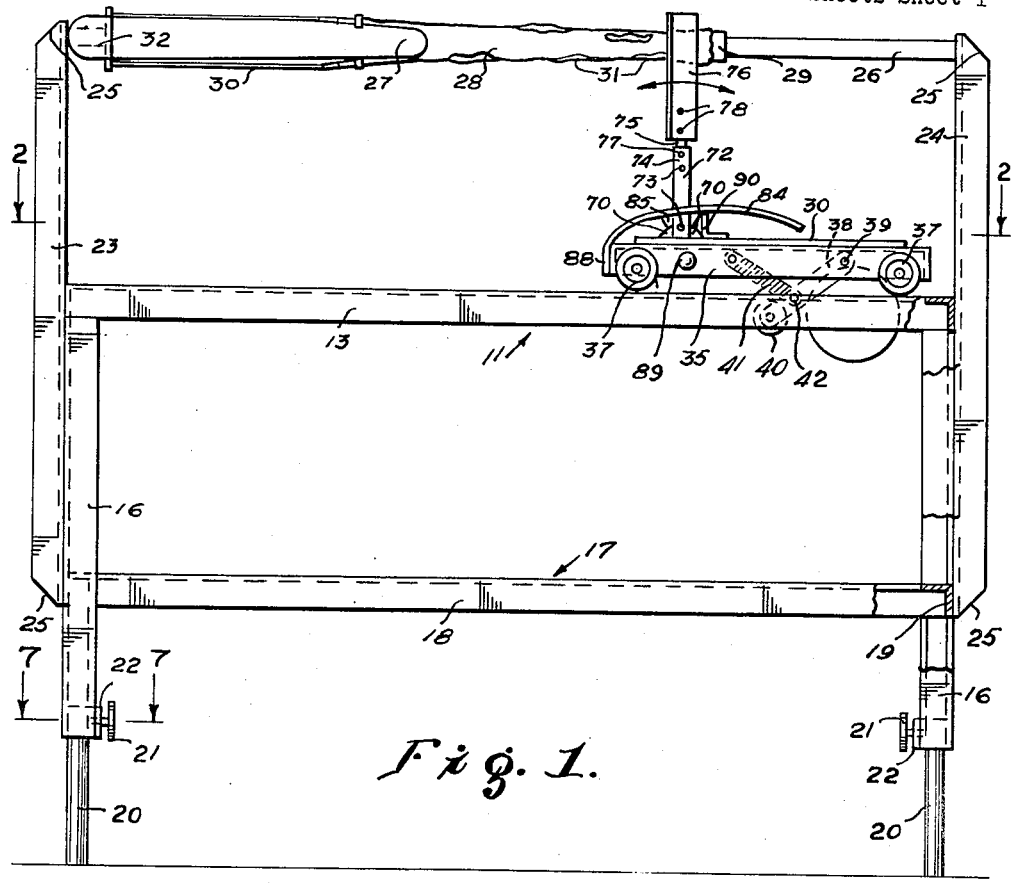
Fig. 1 is a side elevational view of a fleshing machine embodying the invention.
Figure 2:
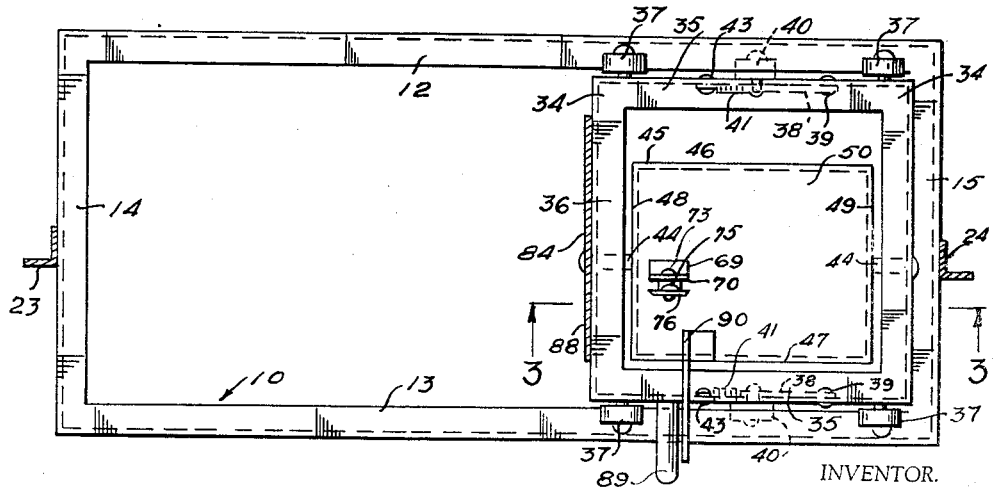
Fig. 2 is a longitudinal sectional view on the line 2—2 of Fig. 1.

Referring more in detail to the drawings, wherein like parts are designated by like reference numerals, the reference numeral 10 is used to generally designate a fleshing machine embodying the invention.

The fleshing machine 10 comprises a main frame 11 that is constructed of angle iron and includes side members 12 and 13, respectively, and end members 14 and 15, respectively, that are assembled in fixed relation to each other to provide a frame of rectangular formation.

Secured to each corner of the frame 11 and depending therefrom in vertical relation thereto, are four tubular standards 16. Secured to the standards 16, in spaced relation below the frame 11, is an auxiliary reinforcing frame 17 of rectangular formation which comprises side members 18 and end members 19. Tubular legs 20 are telescopically received in each of the standards 16 and a set screw 21 mounted in an enlargement 22 on each of the standards 16 engages the legs 20 to retain the legs 20 in adjustable relation to the standards 16.

Angle iron uprights or supports 23 and 24, respectively, are secured to the frames 11 and 17 centrally of the end members and in vertical relation to the frames 11 and 17. The upper and lower ends of the uprights 23 and 24 are bevelled as at 25 and the lower end of the uprights terminate at the frame 17 while the upper ends of the uprights 23 and 24 extend above the plane of the frame 11.

A fleshing pole 26 is secured at its opposite ends to the upper ends of the uprights 23 and 24 in parallel relation to the frame 11.

A tapered substantially cone-shaped spindle 27 is mounted on the pole 26 to receive a pelt 28 that is mounted at one end on a sleeve 29 that is mounted on the pole 26.

Retracting cables 30, having holders 31 on one end thereof that are connected to the pelt 28, are connected at their opposite ends to a cap 32 mounted on the large end of the spindle 27 in circumjacent relation thereto. The cables 30 hold the pelt 28 taut while the flesh and fat are being removed from the pelt 28.

The frame 11 is secured to the standards 16 so that the angle members present a flat trackway on which is mounted a substantially square-shaped outer carriage 34 which is formed of angle iron side members 35 and end members 36. A roller 37 is mounted on the side members 35 adjacent each end thereof and the rollers 37 are mounted for reciprocating movement of the carriage 34 on the frame 11.

A lever 38 is pivotally connected at 39 to each of the side members 35 of the carriage 34 so that a roller 40 mounted on each free end of the levers 38 will engage the undersurface of the side members 12 and 13 of the frame 11 centrally of the rollers 37. A tensioning spring 41 is connected at one end at 42 to each of the levers 38 inwardly of the rollers 40 and the opposite ends of the springs 41 are connected at 43 to the side members 12 and 13 and the springs 41 tension the levers 38 to urge the rollers 40 into contact with the side members 12 and 13 to retain the carriage 34 on the frame 11.

Bearings 44 are mounted in the end members 36 of the carriage 34 to pivotally mount an inner substantially rectangular-shaped frame 45 within the outer frame 34. The frame 45 comprises side members 46 and 47, respectively, and end members 48 and 49, respectively.

A substantially rectangular-shaped plate 50 is mounted on the inner frame 45 to provide a flat upper surface for the inner frame 45.

A hinge leaf 51 is secured to the undersurface of the end member 49 of the inner frame 45 centrally thereof by fasteners 52.

A mounting bracket 53 is hingedly connected at 54 to the hinge leaf 51 and the bracket 53 has an offset step portion 55 at the free end thereof. An electric motor 56 is secured to the mounting bracket 53 in depending relation thereto and a pulley 57 is connected to the drive shaft 58 of the motor 56.

A nut 59 is welded to the step portion 55 and a belt tightening bolt 60 is mounted in the nut 59, as shown in Fig. 3. The bolt 60 is rotatably connected at 61 to the undersurface of the plate 50. Rotation of the bolt 60 will raise and lower the bracket 53 to tension the belt 62 that engages the pulley 57 on the drive shaft 58 of the motor 56.

The belt 62 also engages a pulley 63 mounted on a shaft 64 that is journalled in bearings 65 and 66, respectively, so that the shaft 64 is in parallel relation to the end member 48 of the frame 45. The bearings 65 and 66 are secured to the undersurface of the plate 50 by fasteners 67.

A cam 68 is mounted on the end of the shaft 64 opposite to the end thereof on which is mounted the pulley 63.

An opening 69 is provided in the plate 50 in alinement with the cam 68 and a semi-circular mounting bracket 70 is secured to the plate 50 adjacent the opening 69 by fasteners 71. A mounting arm 72 is pivotally connected to the bracket 70 by a pivot pin 73. The upper end of the arm 72 is provided with a socket 74 which receives a handle 75 on which is mounted a cutting blade 76. The handle 75 is retained in the socket 74 by Allen screws 77 and the blade 76 is also connected to the handle 75 by Allen screws 78. The arm 72 below the pivot pin 73 has an offset arcuate portion 79 and a roller 80 journalled on the end of the portion 79 engages the cam 68. A L-shaped bracket 81 is secured to the undersurface of the plate 50 adjacent the lower end of the portion 79 by a fastener 82. An expansion spring 83 extends between the bracket 81 and the portion 79 of the arm 72 to urge the roller 80 into engagement with the cam 68.

An arcuate shaped refuse guard 84 has a semi-circular mounting bracket 85 connected thereto by a fastener 86 and the bracket 85 is pivotally mounted on the pivot pin 73 so that it extends over the plate 50 of the carriage 45. The guard 84 has an opening 87 through which the arm 72 extends so that the blade 76 will be located adjacent the pelt 28. The guard 84 has a depending vertical end 88 that extends over the end member 36 adjacent the arm 72.

A hand grip 89 is secured to one of the side members 35 of the frame 34 and extends outwardly of the side member 13 of the frame 11 so that the carriage 34 may be manually reciprocated on the frame 11. A second hand grip 90 is secured to the upper surface of the plate 50 adjacent the outer edge thereof in spaced parallel relation to the hand grip 89 and the hand grip 90 also extends outwardly of the side member 13 of the frame 11. The grip 90 permits the carriage 34 to be pivoted to apply the cutting blade 76 to the pelt 28.

In operation the pelt 28 is mounted on the fleshing pole 26 and spindle 27, as shown in Fig. 1. The motor 56 is started and the rotation of the shaft 64 will rotate the cam 68. The cam 68 engaging the roller 80 on the arm 72 will cause the blade 76 to rock back and forth. The carriage 34 is then moved along the frame 11 by grasping the hand grip 89 and manually moving the carriage 34 along the frame 11. By grasping the hand grip 90, the knife 76 is moved into engagement with the pelt 28 so that the flesh and fat 33 may be removed from the pelt 28. When one pelt has been cleaned, another pelt is positioned as previously described and the operation previously described is repeated.

There has thus been described a fleshing machine that will efficiently clean a pelt, a fleshing machine that is easy to operate, and a fleshing machine that is simple, yet durable in construction.

It is believed that from the foregoing description the construction and operation of the invention will be clear to those skilled in the art and it is to be understood that changes in the minor details of construction, arrangement and combination of parts may be resorted to provided they fall within the spirit of the invention and the scope of the appended claims.

Having thus described the invention what is claimed as new and desired to be secured by Letters Patent is:

1. A fleshing machine comprising a main frame, means for supporting the frame in elevated position above the ground, uprights secured to said frame, means connected to said supports for mounting a pelt thereon, a carriage mounted for reciprocation on said main frame, a cutting knife pivotally mounted on said carriage, means also mounted on said carriage for rocking said knife as said carriage is moved along said frame so that said knife will clean said pelt and said carriage comprises an outer frame having rollers thereon for engagement with said main frame and an inner frame pivotally mounted within said outer frame.

2. A fleshing machine as in claim 1, wherein spring tensioned levers are pivotally mounted on said carriage and second rollers are mounted on said levers for engagement with said frame to retain said carriage on said frame.

3. A fleshing machine comprising a main frame, means for supporting the frame in elevated position above the ground, uprights secured to said frame, means connected to said supports for mounting a pelt thereon, a carriage mounted for reciprocation on said main frame, a cutting knife pivotally mounted on said carriage, means also mounted on said carriage for rocking said knife as said carriage is moved along said frame so that said knife will clean said pelt, an electric motor is mounted on the undersurface of said carriage, a shaft having a cam on one end and a pulley on the opposite end is journalled on said carriage, a belt drive from said motor engaging said pulley for the rotation of said shaft, and an arm for mounting said knife is pivotally mounted on said carriage and is engaged by said cam to give the rocking motion to said knife.

4. A fleshing machine comprising a main frame, means for supporting the frame in elevated position above the ground, uprights secured to said frame, means connected to said supports for mounting a pelt thereon, a carriage mounted for reciprocation on said main frame, a cutting knife pivotally mounted on said carriage, means also mounted on said carirage for rocking said knife as said carriage is moved along said frame so that said knife will clean said pelt, means is provided for pivotally mounting an electric motor on the undersurface of said carirage and a belt drive connection is provided between said motor and the means for rocking said knife and means is provided for adjusting said first means to tighten said belt drive.

References Cited in the file of this patent

UNITED STATES PATENTS 2,896,438     Larsson _____ July 28, 1959